United States Patent [19]

Jennings et al.

[11] 4,264,252
[45] Apr. 28, 1981

[54] BALE HANDLING MEANS

[75] Inventors: Richard E. Jennings, New Holland; Willis R. Campbell, Ephrata; Thomas W. Waldrop, New Holland, all of Pa.

[73] Assignee: Sperry Corporation, New Holland, Pa.

[21] Appl. No.: 933,326

[22] Filed: Aug. 14, 1978

[51] Int. Cl.³ ............................................ A01D 87/12
[52] U.S. Cl. .................................... 414/24.5; 294/61; 294/105; 414/622; 414/920; 414/703
[58] Field of Search ............... 414/495, 619, 621, 622, 414/911, 24.5, 908, 920, 24.6, 703; 294/61, 104, 105

[56] References Cited

U.S. PATENT DOCUMENTS

| | | | |
|---|---|---|---|
| 2,587,769 | 3/1952 | Rowe | 414/739 |
| 2,618,360 | 11/1952 | MacDonald | 414/621 X |
| 2,828,880 | 4/1958 | Perry | 414/621 X |
| 3,934,726 | 1/1976 | Martin | 214/131 A |
| 3,938,682 | 2/1976 | Rowe | 414/474 |
| 3,982,645 | 9/1976 | Brink et al. | 414/621 X |
| 4,027,773 | 6/1977 | Kenworthy | 414/685 |
| 4,040,534 | 8/1977 | Kenworthy | 414/685 |

FOREIGN PATENT DOCUMENTS

| | | | |
|---|---|---|---|
| 839623 | 3/1976 | Belgium | 414/621 |
| 903555 | 12/1953 | Fed. Rep. of Germany | 414/621 |

OTHER PUBLICATIONS

Implement and Tractor Magazine; Jan. 7, 1957; p. 51.
Hawk Bilt Advertising Brochure; Form 343; Model 60A Bale Carrier.
Farmhand Advertising Brochure; SL-154; Aug. 1975; Big Bale Fork.

Primary Examiner—Leslie J. Paperner
Assistant Examiner—Terrance L. Siemens
Attorney, Agent, or Firm—Frank A. Seemar; James R. Bell; Larry W. Miller

[57] ABSTRACT

A large crop material bale handler mountable to a prime moving vehicle operable to retrieve, transport and discharge large crop material bales is provided with a main support frame, a traveling load support with material engaging elements fastened to the lower portion thereof, power lifting apparatus to raise and lower the load support, and grappling members pivotally affixed at a pivot point to the load support and extending outwardly and downwardly therefrom. The grappling member has a material engaging end and an opposing end. The pivot point further overlies the plane of the material engaging elements such that when the grappling member is in the engaged position the material engaging end, in combination with the material engaging elements, exerts a grappling and lifting force on a bale.

9 Claims, 10 Drawing Figures

BALE HANDLING MEANS

BACKGROUND OF THE INVENTION

This invention is concerned generally with bale handling devices and more specifically with apparatus that will retrieve, transport and discharge bales of crop material equally well either from ground level or elevated storage positions.

Historically, it has been the custom to harvest forage crops by mowing the crop, letting it dry in the fields, forming the dried crop into windrows and passing a hay-baling machine over and along these windrows to form the crop material into rectangular bales. Recent practice has shown that formation of crop materials into large compact rolls, rather than rectangular bales as formerly done, is a commercially lucrative and labor extensive practice for both small farms and large scale commercial hay operations. The large round bales have proven to be especially attractive because the rolled material tends to provide a self-shedding protective covering from inclement weather along the outer surface. This protective covering creates the ability to leave these rolled bales in fields for storage, rather than having to gather and transport them to a storage area protected from the elements as was necessary with rectangular bales.

These round bales of forage material are generally 4½ to 8 feet in diameter and have an approximate weight of between 600 to 3000 pounds. Because of their size and nature, there is a definite need to develop new and durable apparatus for retrieving and transporting these bales. Commercial manufacturers have recognized this need as well as farmers. Numerous devices have been produced that will permit the handling of single bales. However, no apparatus prior to the instant invention has been capable of being so easily maneuvered within enclosed areas to retrieve, transport and discharge large bales stored on either the ground or in elevated positions. Commercial large bale handling and transporting operations require an apparatus that will permit the stacking and unstacking of bales on flatbed trucks. Additionally, some commercial operators, as well as farmers, stack bales in enclosed structures or partially enclosed structures, such as pole barns.

Previous equipment commonly used a front end loader on a tractor or other prime moving vehicles. This presented serious safety problems since the elevating of a load beyond a certain critical height under certain circumstances causes the tractor to become unstable, especially transversely to the longitudinal axis of the tractor, or creates the potential to have the bale roll back onto the tractor operator. Extended use of a front end loader additionally causes damage to the tractor front axle wheel spindles because of the excessive load strains to which they are subjected. This necessitates frequent repair after relatively short periods of time. Front end loaders are further severely limited in their ability to meet this large bale handling need in muddy, slippery conditions since the front end loader weight distribution causes the rear wheels of the tractor to some degree to lift off the ground and therefore lose traction. Additionally, most front end loader type devices used prior to this time permit the bale to sag about its support points because of the sheer weight of the bale and the techniques utilized to support this weight. This sagging is especially significant when bales are sought to be stacked in tiers 2 or 3 high.

The foregoing problems are solved in the design of the machine comprising the present invention by utilizing a crop material bale handling means with a pivotable grappling means that in combination with material engaging means will exert a grappling and lifting force diagonally across the center of gravity of a crop bale and will be elevatable along a main support frame to facilitate the stacking and unstacking of tiers of bales.

SUMMARY OF THE INVENTION

It is an object of the present invention to provide an improved crop material bale handling means mountable to a tractor that is operable to retrieve, transport and discharge a large bale which utilizes pivotal grappling means offset from the vertical plane of the main support frame and elevatable in a generally vertical plane, so that the bales are suspended by means of the resulting lifting force passing diagonally through the center of gravity of the bale.

It is another object of the present invention to provide a bale handling means that eliminates bale sag when the bale is being transported.

It is a further object of the invention to provide an improved bale handling means that releases the bale from the apparatus immediately upon disengagement of the grappling means.

It is a further object of this invention to provide a bale handling means that can be used to stack and unstack large crop material bales on flatbed transport vehicles or within enclosed structures.

It is another object of the present invention to provide a bale handling means that can be mounted to the rear of a tractor and be operated in muddy, slippery conditions without losing traction.

These and other objects and advantages are obtained by providing a large crop material bale handler mountable to a prime moving vehicle operable to retrieve, transport and discharge large crop material bales having a main support frame, a traveling load support means with material engaging means fastened to the lower portion thereof, power lifting means to raise and lower the load support means, and grappling means pivotally affixed at a pivot point to the load support means and extending outwardly and downwardly therefrom having a material engaging end and an opposing end, the pivot point further overlying the plane of the material engaging means such that when the grappling means is in the engaged position the material engaging end, in combination with the material engaging means, exerts a grappling and lifting force on the bale.

BRIEF DESCRIPTION OF THE DRAWINGS

The advantages of this invention will become apparent upon consideration of the following detailed disclosure of the invention, especially when it is taken in conjunction with the accompanying drawings wherein.

DETAILED DESCRIPTION OF THE PREFERRED EMBODIMENT

Figure 1:
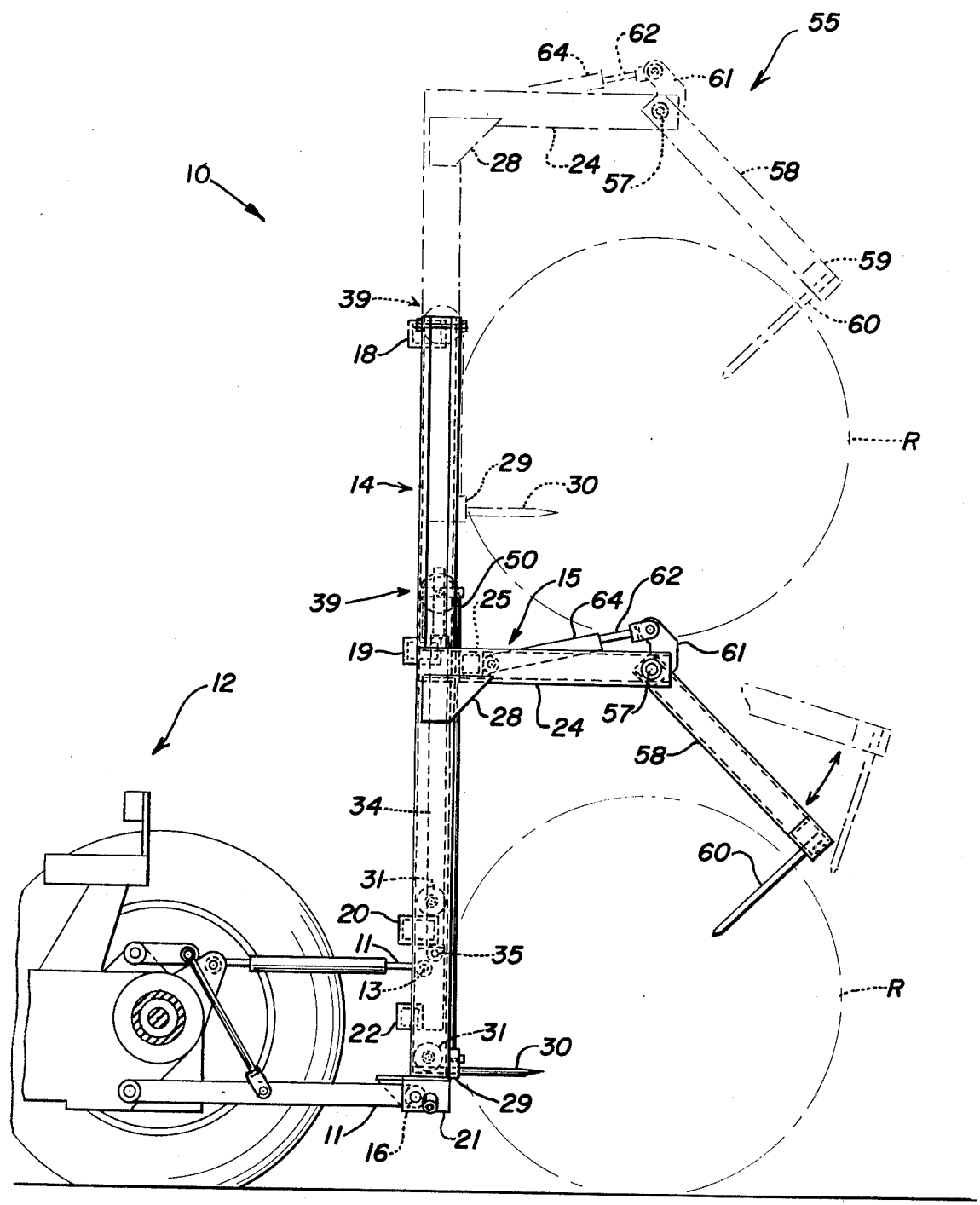
FIG. 1 is a side elevational view of a bale handling means mounted to a 3-point hitch of a farm tractor with the load support means shown in the lowered position in solid lines and in a raised position in the phantom lines.

FIG. 1 shows the bale handling means 10 mounted to a tractor 3-point hitch 11 at the rear of the tractor 12. The 3-point hitch 11 is connectable to the bale handling means 10 at a 3-point hitch upper mounting point 13 and two lower 3-point hitch mounting assemblies 16 on opposing sides of the bale handling means 10. The bale handling means 10 can be seen to be comprised of a main support frame, indicated generally by the numeral 14, and a traveling load support means 15. The main support frame 14 is seen in best detail in FIGS. 1, 2 and 3.

Figure 2:
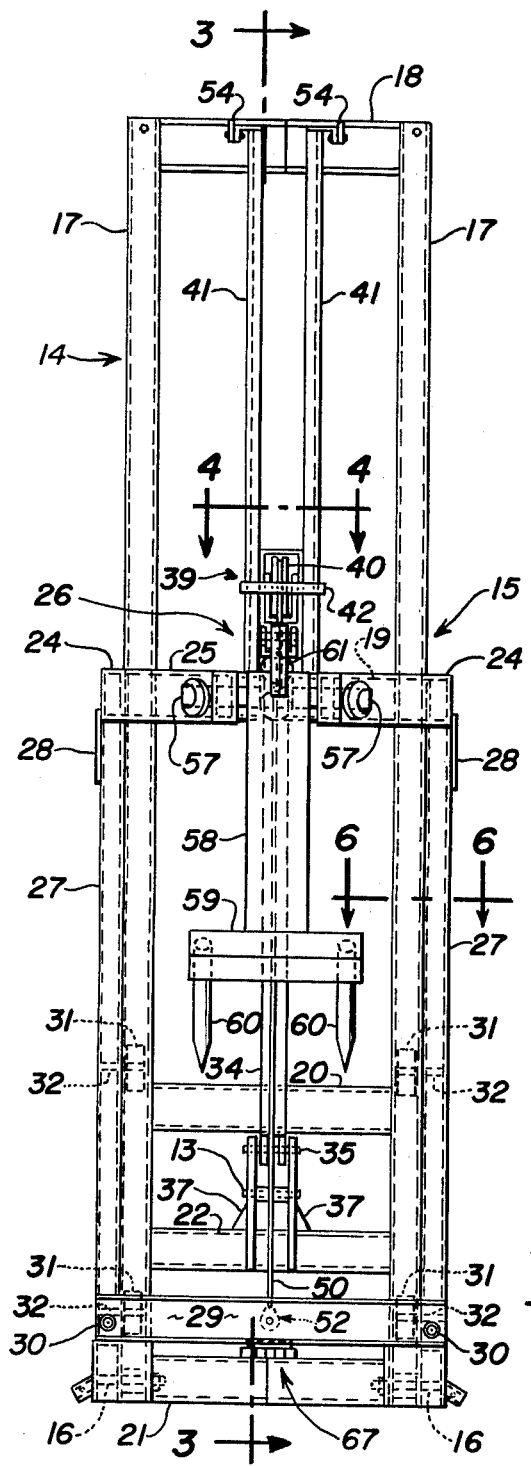
FIG. 2 is a rear elevational view of the apparatus in FIG. 1 with the tractor removed.

The main support frame 14 of FIG. 2 has two parallel, spaced apart and upright support beams 17 running substantially the entire length of the frame. The main support frame 14 has a series of transverse connecting members between the support beams 17. Transverse support members 18, 19, 20 and 21 are recessed from the plane of support beams 17. This recessed configuration permits the traveling load support means lift assembly, indicated generally by the numeral 26, to raise and lower the traveling load support means 15 along the track provided by support beams 17 in an unobstructed path. The two support beams 17 are further strengthened by transverse connecting member 22.

The traveling load support means 15 is mounted to and travels in a path defined by vertical support beams 17. The load support means 15 consists of two horizontal support arms 24 extending from the outside of each of the support beams 17. Support arms 24 are connected by a transverse bracing member 25. These support arms 24 further are fastened to a pair of track elements 27 adjacent the exterior sides of support beams 17 by welded angle plates 28. Track elements 27 are transversely connected at their bottommost portion by a transverse mounting plate 29. On each opposing end of mounting plate 29 are elongated tines 30 for penetrating a crop material bale R. Track elements 27 are guided along support beams 17 by means of two pairs of rollers 31 suitably mounted about the shafts 32. Shafts 32 are anchored within track elements 27 but extend into beams 17, within which, the rollers 31 are housed. Each roller 31 has a roller bearing assembly 33, shown briefly in FIG. 7.

Traveling load support means 15 is raised through its path by means of the lift assembly, indicated generally by the numeral 26 in FIG. 2. Lift assembly 26 comprises a hydraulic cylinder 34 fastened in a suitable manner, such as by bolts or locking pins 35, to mounting brackets 37, best seen in FIG. 2. Mounting brackets 37 are suitably affixed, such as by welding, to transverse connecting member 22. Alternately brackets 37 can further be affixed to transverse support member 20 for greater strength. The cylinder 34 has an extensible rod 38 that connects to a cable and pulley multiplier assembly, indicated generally by the numeral 39.

The cable and pulley multiplier assembly 39, with its various mounting brackets is best shown in FIGS. 2, 3, 4 and 5. The cable and pulley multiplier assembly 39 will be described only generally, since the principles employed are old and well known to one skilled in the art. Briefly, the multiplier assembly is used to permit the traveling load support means 15 to be elevated to a height that is approximately twice the length of the hydraulic cylinder rod 38 when it is extended its full stroke. In the preferred embodiment of this mechanism, this feature permits the bale handling means to stack 5½ foot diameter bales three high on the ground or two layers high on a flatbed trailer with a bed height of 40 inches.

Figure 4:
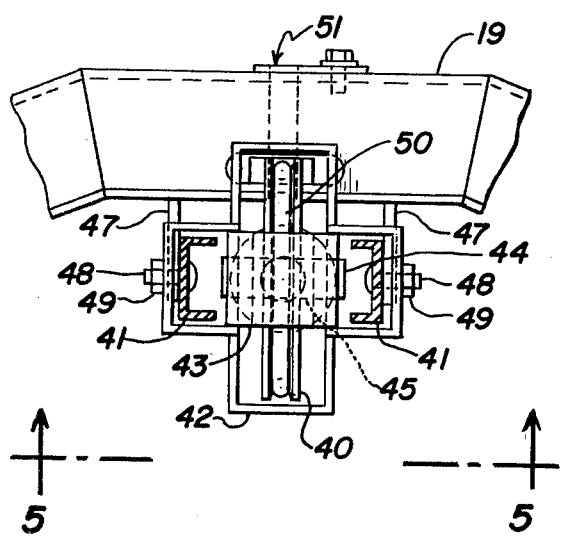
FIG. 4 is an enlarged sectional view taken along the line 4—4 of FIG. 2 showing the details of construction of the pulley cage and guide track.
Figure 5:
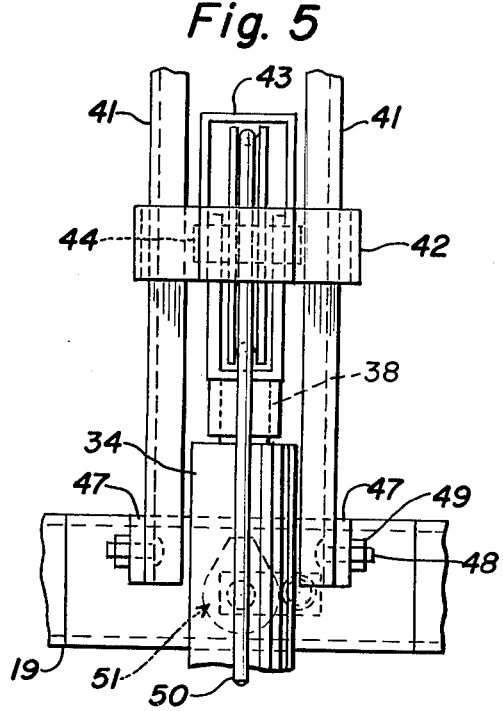
FIG. 5 is a fragmentary elevational view of the structure shown in FIG. 4 taken along the line 5—5.
Figure 6:
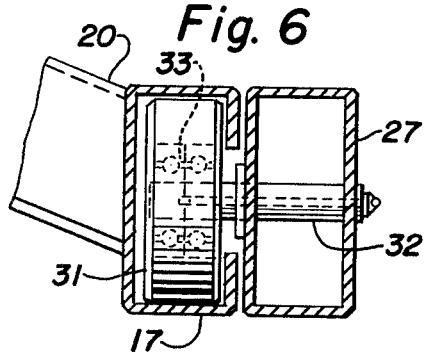
FIG. 6 is an enlarged sectional view taken along the line 6—6 of FIG. 2 showing the details of one load support means mounting roller.

The cable and pulley multiplier assembly 39 has a pulley 40 that is suitably mounted to a pair of guides 41 that are fastened in FIG. 2 at their uppermost point to the recessed transverse support members 18 in an appropriate manner, such as by bolts. FIG. 4 best shows the arrangement of the pulley 40 in its pulley cage 42 and its guides 41. The pulley 40 is mounted about a shaft 44 with a bearing housing 45 and is encased in a pulley case 43 that is suitably fastened to cylinder rod 38. The pulley cage 42 is piloted along guides 41. Guides 41 at their lowermost ends are anchored by means of stub extensions 47 to recessed transverse support 19 by suitable fastening means, such as bolts 48 and locking nuts 49. A cable 50 then extends about the pulley 40 and is fastened at its upper end into suitable retaining means, indicated generally by the numeral 51, on and within transverse support member 19. At its opposing end cable 50 is retained by similar suitable retaining means 52 within transverse mounting plate 29, best shown in FIG. 2. The pulley 40 then is used in combination with the hydraulic cylinder 34 to elevate the traveling load support means 15 upwardly along support beams 17 until the pulley 40 is raised through the full length of the stroke of cylinder rod 38 to a point just below the mounting brackets 54 of FIG. 2. Brackets 54 are fixedly fastened to the top of transverse support member 18.

Figure 3:
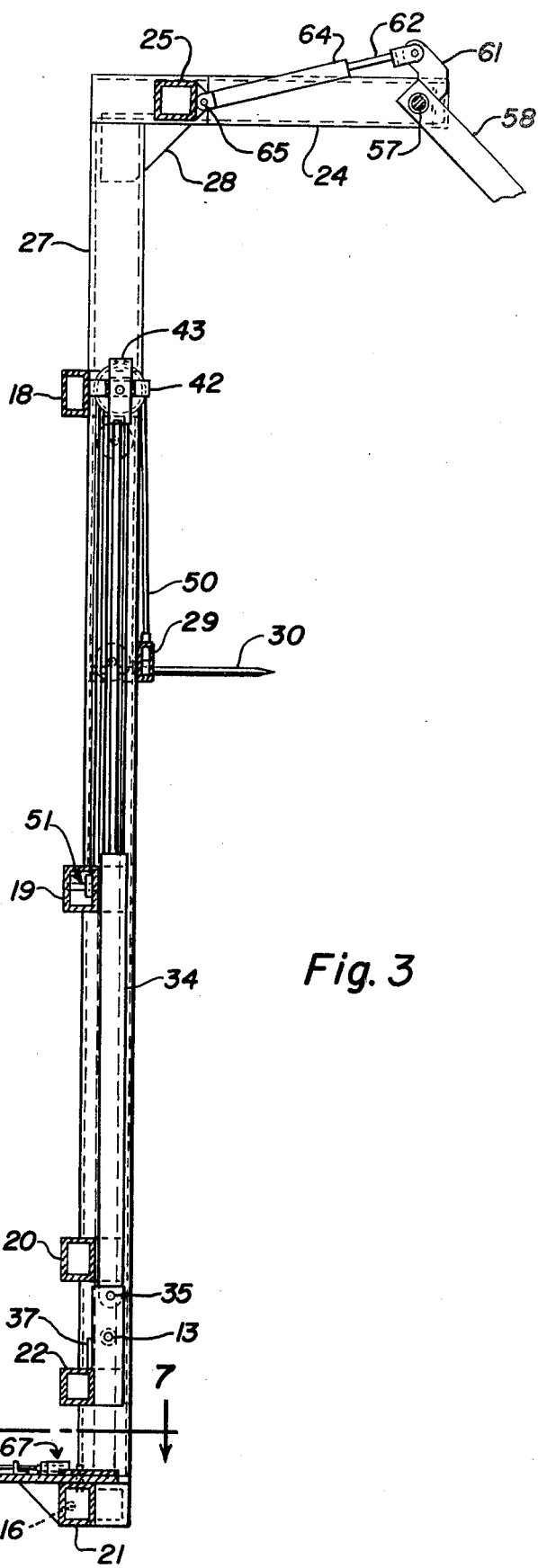
FIG. 3 is a sectional view taken along the line 3—3 of FIG. 2, but with the load support means shown in the raised position.

The grappling means assembly, indicated generally by the numeral 55 in FIG. 1, is pivotally mounted to horizontally extending support arms 24 by shaft and bearing assemblies 57. Grappling arm 58 is mounted about shaft and bearing assembly 57 and at its opposing end has a mounting plate 59 with a pair of elongated tines 60 attached thereto and best shown in FIG. 2. In FIGS. 1 and 3, grappling arm 58 has at its pivot end and fixedly fastened thereto a mounting bracket 61 to which is coupled the rod 62 of hydraulic cylinder 64. At its opposing end hydraulic cylinder 64 is fastened to transverse bracing member 25 by an appropriate bracket and locking pin 65, best seen in FIG. 3. The pivot point of the grappling arm 58 is established by the shaft and bearing assembly 57 and is positioned so that it is offset from the main support frame 14. The grappling arm's pivot point is positioned so that it is in a vertical plane generally immediately overlying the center of a bale when the bale is engaged by the grappling arm 58, tines 60 and the tines 30 for transport. Ideally, the pivot point lies beyond a plane taken transversely through the center of the bale or, stated alternatively, the pivot point is horizontally a greater distance from the main support frame than is the center of the bale.

The angle at which the tines 60 extend from the mounting plate 59 determines the extent of the resulting lifting force that is exerted upon a bale R by the grappling means 55. The closer the angle is to 90°, the greater is the lifting force. The bale handling means 10 has been operated satisfactorily with this angle varied from the vertical to as low as 79°.

Figure 7:
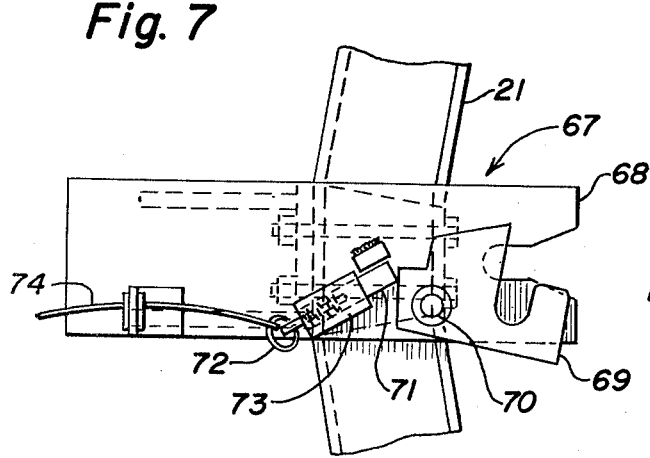
FIG. 7 is an enlarged fragmentary plan view of a wagon towing hitch incorporated into the apparatus taken along the line 7—7 of FIG. 3.

Fastened to the top of transverse support member 21 in FIGS. 1 and 7 is an automatic wagon hitch 67 that enables the tractor operator to fasten a towing vehicle to the bale handling means 10 and release such vehicle without leaving the operator's position. The hitch 67 consists in FIG. 7 of a female receiving member cut into a flat plate 68 with a pivotable latching plate 69 mounted about a shaft and bearing assembly 70. The latching plate 69 is adjacent a spring biased trigger 71 that is connected via a pull ring 72 and a cord 74 to the operator's position. The trigger 71 is contained within a housing 73. When the tractor 12 backs the bale handling means 10 up to a hauling vehicle the hitch of the hauling vehicle engages the plate 69 which pivots counterclockwise to lock the hitch in place against the trigger 71. When it is desired to release the towed vehcile the operator merely pulls on the cord 74 from the operator's position which causes the trigger 71 to be retracted, permitting the latching plate 69 to release the hitch of the towed vehicle while the tractor 12 with the bale handling means 10 is driven away.

Figure 8:
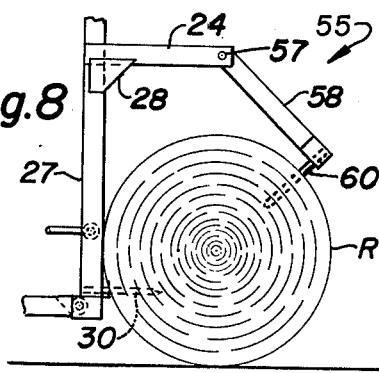
FIG. 8 is a fragmentary diagrammatic illustration showing the engagement from the side of a round bale which is resting on its side.
Figure 9:
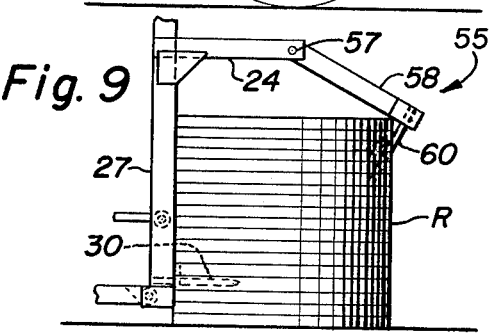
FIG. 9 is a diagrammatic illustration showing the lifting engagement of a round bale that is standing on its end.
Figure 10:
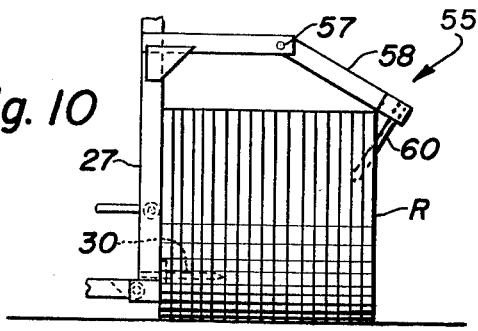
FIG. 10 is a diagrammatic illustration showing the engagement of a round bale from its end with the bale resting on its side.

FIGS. 8, 9, and 10 illustrate the various positions in which bales can be engaged by the grappling means 55 and transported by the bale handling means 10. These figures also show the action of the elongated tines 60 of the grappling means 55 which exert a lifting force generally diagonally across the center of gravity of the bale R. The tines 30 are fastened to the mounting plate 29 of the traveling load support means 15 and are also shown to be cooperatively interacting with the grappling means 55. The limited extent of their penetration of the bale R is also diagrammatically illustrated and clearly shows that the lifting force of the grappling means 55 is necessary to successfully engage and transport any bales.

In operation, the bale handling means 10 is mounted to a tractor via the 3-point hitch 11 at the 3-point hitch upper mounting point 13 and the lower mounting assemblies 16. The traveling load support means 15 is then elevated to the appropriate height to engage the bale R. The tractor 12 then backs toward the bale R until the tines 30 have penetrated and the bale is thus adjacent the track elements 27 of the load support means 15. The hydraulic cylinder 64 is then actuated by the operator and the grappling arm 58 is lowered about shaft and bearing assembly 57 until tines 60 penetrate and engage the bale R, exerting a resulting lifting force and a grappling force that extends generally diagonally across the center of gravity of the bale. The tractor operator then activates the hydraulic cylinder 34 which, in combination with the cable and pulley multiplier assembly 39, raises the traveling load support means 15 to a suitable height for transport. The bale R, thus mounted to the bale handling means 10, is transported to a desired location by the tractor 12. When the bale R is positioned over a location at which the operator desires to discharge the bale, the operator retracts the rod 38 of hydraulic cylinder 34 thus causing the cable and pulley multiplier assembly 39 to cooperate with the cylinder 34 to lower the load support means 15 to the desired height. When the bale R is positioned as desired, such as atop the bed of a truck, other bales, or on the ground, the operator then activates the hydraulic cylinder 64 causing the cylinder rod 62 to retract therein and thus causing the grappling arm 58 to pivot upwardly about shaft and bearing assembly 57 until the tines 60 have disengaged from the bale R. This disengagement effectively releases the bale R immediately from the control of the bale handling means 10. Upon disengagement, the bale R is resting on a suitable support and the tractor 12 can pull forward, thus disengaging the tines 30 and the bale handling means 10 completely from the bale R.

It should be noted that the bale handling means 10 in its preferred embodiment must be operated in conjunction with a prime moving vehicle that has its own independent hydraulic system to which the bale handling means 10 can be connected to operate the hydraulic cylinders. Alternately, it is possible to incorporate a self-contained hydraulic system into the apparatus. It should also be noted that any other suitable means for powering the lift assembly that raises the load support means 15 and which pivots the grappling arm 58 could as easily be utilized. As should be apparent from FIGS. 8, 9, and 10, this invention can be utilized equally well to retrieve, transport and discharge either large round bales or large rectangular bales, although the preferred embodiment is described herein only in conjunction with the large round bales.

While the preferred structure in which the principles of the present invention have been incorporated is shown and described above, it is to be understood that the invention is not to be limited to the particular details thus presented but, in fact, widely different means may be employed in the practice of the broader aspects of this invention. The scope of the appended claims is intended to encompass all obvious changes in the details, materials and arrangements of parts which will occur to one of skill in the art upon a reading of this disclosure.

Having thus described the invention what is claimed is:

1. A large crop material bale handling means mountable to the three point hitch of a tractor and operable to retrieve, transport and discharge a large crop material bale, the combination comprising:
   (a) a main support frame extending in a vertical plane generally upwardly away from the ground a predetermined length adjacent the vehicle;
   (b) a traveling load support means movably mounted to the support frame in a path generally defined thereby and having an upper portion and a lower portion, the lower portion being disposable in a plane generally parallel to the ground;
   (c) power lifting means to elevate and lower the traveling support means;
   (d) a pulley and cable multiplier assembly cooperative with the power lifting means to increase the lifting height of the traveling load support means to a height that is greater than the lifting height of the power lifting means alone;
   (e) material engaging means fastened to the lower portion of the load support means including at least a first pair of elongated tines adapted at a terminal end to penetrate the bale;

(f) at least a second pair of elongated tines adapted at a terminal end to penetrate the bale and being attachable to an elongate support member on a first end, the support member being pivotally affixed about a horizontal axis at a pivot point adjacent an opposing second end to the upper portion of the load support means and having a material engaging end, the pivot point further being offset from the main support frame and located so that it is horizontally a greater distance from the main support frame than is the center of the bale and overlying the plane of the material engaging means so that when the second pair of tines and the support member is pivoted downwardly the second pair of tines in combination with the first pair of tines exerts a grappling and lifting force on the bale; and (g) power means to pivot the second pair of tines.

2. The bale handling means according to claim 1, wherein the power lifting means comprises a hydraulic cylinder.

3. The bale handling means according to claim 2, wherein the power means of the second pair of elongated tines is a hydraulic cylinder.

4. In a large crop material bale handler having a main support frame mountable to the three point hitch of a tractor, a traveling load support means with material engaging means fastened to a lower portion thereof and disposable in a plane generally parallel to the ground, the load support means being mounted to the main support frame and movable in a path defined generally thereby, power lifting means to raise and lower the load support means, the improvement comprising in combination:

(a) grappling means pivotally affixed at a pivot point to the load support means extending outwardly and downwardly therefrom and having a material engaging end and an oppositng end, the pivot point being offset from the main support frame and beyond a plane taken transversely through the center of the bale so that when the grappling means is in the bale carrying position against a bale the grappling means and the material engaging means in combination exert a grappling and lifting force upon the bale; and (b) automatic coupling mechanism attached to the main support frame at an appropriate height that will permit a tractor operator to engage for towing or disengage a bale hauling apparatus without having to leave the operator's position.

5. The bale handling means according to claim 4, wherein the material engaging means comprises at least a pair of elongated tines adapted at their terminal ends to penetrate the bale.

6. The bale handling means according to claim 5, wherein the grappling means includes at least a pair of elongated tines adapted at their terminal ends to penetrate the bale.

7. The bale handling means according to claim 6, wherein the power lifting means comprises a hydraulic cylinder.

8. The bale handling means according to claim 7, wherein the power lifting means further includes a cable and pulley assembly such that the traveling load support means is elevatable to a height that is greater than the vertical reach of the power lifting means.

9. A large crop material bale handling means mountable to a prime moving vehicle operable to retrieve, transport and discharge bales, each bale having a center positioned along a longitudinal axis and a center of gravity, the bale handling means comprising:

(a) a main support frame extending upwardly from the ground adjacent the vehicle;

(b) a traveling load support means movably mounted to the support frame in a path generally defined thereby and having an upper portion and a lower portion, the lower portion having material engaging means fastened thereto and extending therefrom generally horizontally;

(c) power lifting means to raise and lower the traveling load support means;

(d) grappling means pivotally affixed at a pivot point to the upper portion of the load support means extending outwardly, the grappling means further having a pivot end and a material engaging end, the pivot point being offset from the main support frame and beyond a plane transversely taken through the center of the bale so that when the grappling means is pivoted downwardly the material engaging end in combination with the material engaging means exerts a grappling and lifting force, the grappling force extending diagonally across the center of gravity of the crop bale; and (e) power means to pivot the grappling means;

(f) the automatic coupling apparatus attached to the main support frame at an appropriate height so that the operator is enabled to engage for towing or disengage a bale hauling apparatus without having to leave the operator's platform.

* * * * *